(12) United States Patent
Arold et al.

(10) Patent No.: US 9,707,841 B2
(45) Date of Patent: Jul. 18, 2017

(54) TANKS FORMING RACK SUPERSTRUCTURE

(71) Applicant: Quantum Fuel Systems LLC, Lake Forest, CA (US)

(72) Inventors: Mark Arold, Torrance, CA (US); Joseph Hudak, Long Beach, CA (US); Christopher Jaeger, Kirkland, WA (US); Tae Kim, Orange, CA (US); Derrin Olischefski, Trabuco Canyon, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

(21) Appl. No.: 14/938,795

(22) Filed: Nov. 11, 2015

(65) Prior Publication Data
US 2016/0332514 A1 Nov. 17, 2016

Related U.S. Application Data

(63) Continuation of application No. PCT/US2015/030906, filed on May 14, 2015.

(51) Int. Cl.
| | | |
|---|---|---|
| *B60K 15/067* | (2006.01) | |
| *F17C 13/08* | (2006.01) | |
| *B60K 15/07* | (2006.01) | |
| *B60K 15/03* | (2006.01) | |

(52) U.S. Cl.
CPC ............ *B60K 15/067* (2013.01); *B60K 15/07* (2013.01); *F17C 13/083* (2013.01);
(Continued)

(58) Field of Classification Search
CPC .... B60K 15/067; B60K 15/07; B60K 15/063; F17C 13/083; F17C 13/084; F17C 13/08;
(Continued)

(56) References Cited

U.S. PATENT DOCUMENTS

| | | | | |
|---|---|---|---|---|
| 2,652,174 A | * | 9/1953 | Shea | B65D 19/38 206/512 |
| 2,808,176 A | * | 10/1957 | Osborne | B65D 90/14 206/512 |

(Continued)

FOREIGN PATENT DOCUMENTS

| | | |
|---|---|---|
| EP | 1262710 | 12/2002 |
| EP | 2048427 | 4/2009 |
| KR | 10-2003-0079006 | 10/2003 |

OTHER PUBLICATIONS

International Patent Application No. PCT/US2015/030906; Int'l Preliminary Report on Patentability; dated Nov. 24, 2016; 10 pages.
(Continued)

*Primary Examiner* — Robert J Hicks
(74) *Attorney, Agent, or Firm* — Baker & Hostetler LLP (57) ABSTRACT

A support structure which includes tank formed rack comprising at least two modules affixed to each other via attached bases and a method of reduced weight storage of fuel tanks also for use in motor vehicles wherein the fuel tanks via attached bases are used to form a portion of the rack superstructure.

4 Claims, 8 Drawing Sheets

(52) U.S. Cl.
CPC .. *F17C 13/084* (2013.01); *B60K 2015/03032* (2013.01); *B60K 2015/03151* (2013.01); *B60K 2015/03453* (2013.01); *F17C 2201/0104* (2013.01); *F17C 2201/035* (2013.01); *F17C 2201/056* (2013.01); *F17C 2205/013* (2013.01); *F17C 2205/0107* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2260/012* (2013.01); *F17C 2270/0171* (2013.01); *Y02E 60/321* (2013.01)

(58) Field of Classification Search
CPC . B65D 21/0209; B65D 21/0215; B65D 21/02
USPC ............ 220/562, 1.5, 23.6, 23.4, 4.27, 4.26, 220/23.83, 581; 206/512, 511, 509, 504, 206/503; 211/194
See application file for complete search history.

(56) References Cited

U.S. PATENT DOCUMENTS

| | | | | |
|---|---|---|---|---|
| 3,464,661 | A | * | 9/1969 | Alesi, Jr ............... F16L 3/2235 248/68.1 |
| 3,543,951 | A | * | 12/1970 | Marvin .................. A47B 53/00 206/216 |
| 4,099,626 | A | * | 7/1978 | Magnussen, Jr. .... A47B 73/006 211/194 |
| 6,006,935 | A | | 12/1999 | Driver |
| 2007/0170180 | A1 | * | 7/2007 | Watanabe ............. B60K 15/07 220/4.12 |
| 2009/0090726 | A1 | | 4/2009 | Kawamata |

OTHER PUBLICATIONS

International Search Report dated Aug. 21, 2015, issued in International patent application PCT/US2015/030906 filed May 14, 2015.

* cited by examiner

TANKS FORMING RACK SUPERSTRUCTURE

CROSS-REFERENCE TO RELATED APPLICATIONS

This application is a Continuation of International Patent Application No. PCT/US2015/030906, filed May 14, 2015, the contents of which are incorporated herein by reference in their entirety.

BACKGROUND

1. Field

This disclosure relates to a load bearing compressed gas tank mounting structure for motor vehicles.

2. General Background

Pressurized cylinder failure is measured in terms of burst pressure. If a cylinder has a 3000 psi rating it will have a burst strength (or failure rating) of 2-3 times that normal 3000 psi rating.

Pressurized cylinders are useful; for storing and transporting fuels such as hydrogen, natural gas (CNG) and propane.

Storage of gaseous fuel cylinders/tanks in a tractor or trailer must meet crash safety requirements.

Tractor Trailers have many different weight ratings which may affect their usage and the cost of usage.

Gross Vehicle Weight (GVW). This is the total weight of the loaded vehicle. This includes the vehicle itself and the cargo that is loaded on the vehicle.

Gross Combination Weight (GCW). This is specified by the manufacturer as the maximum loaded weight of a truck/tractor plus the trailer or semi-trailer designed for use with the truck/tractor.

Gross Vehicle Weight Rating (GVWR). This is the rating that is calculated by the manufacturer as the amount of weight that the vehicle will be when the vehicle itself is weighed, filled with fuel, and loaded according to the manufacturer's specification.

Gross Combination Weight Rating (GCWR). This is the maximum allowable combined mass of a towing road vehicle, passengers and cargo in the tow vehicle, plus the mass of the trailer and cargo in the trailer. This rating is set by the manufacturer.

Safety Compliance Weight. The Federal Motor Carrier Safety Regulations (FMCSRs) have two definitions of a Commercial Motor Vehicle (CMV) for interstate carriers; each definition applies to specific safety regulations. Sec. 390.5 defines the weight of a CMV as 10,001 lbs. or more GVW/GCW or GVWR/GCWR. In this situation, the FMCSA may use either the GVW or the GVWR (whichever is highest). If the actual GVW of the vehicle is 9,150 lbs. but it has a manufacturers' GVWR of 10,500 lbs., it is a CMV subject to the rules. The definition in Parts 382 and 383 says a CMV is 26,001 or more lbs. GCWR or GVWR. In this case, only the manufacturers' weight rating matters. The actual gross vehicle weight is not a factor in determining compliance. When a state adopts the FMCSRs for their intrastate carriers, a different weight threshold may be adopted for intrastate compliance.

Registration Weight. The registered weight of a vehicle is not related to any compliance with the FMCSRs. A vehicle must be registered for the actual gross weight or combined gross weight. This means the empty weight of the vehicle plus the empty weight of any towed vehicle, plus the weight of the heaviest load to be carried. Generally, vehicles should not be registered for a weight higher than the weight rating; most states will not allow registration exceeding the weight rating. If the vehicle travels on the highways at a weight higher than the registered weight shown on the registration, a citation may be issued for overweight on vehicle registration.

Any vehicle operating interstate with a GVW or GCW or registered weight of 26,000 lbs. or more, or having three axles at any weight, is subject to the International Registration Plan (IRP) for apportioned registration and the International Fuel Tax Agreement (IFTA) for payment of fuel use taxes. These base state agreements do not use the vehicle weight rating when determining compliance.

Highway Weight. This is the legal weight related to highway size and weight limits. When operating on the interstate system, the maximum permissible weight is 20,000 lbs. on a single axle, 34,000 lbs. on a tandem axle, and 80,000 lbs. max gross weight. The "Bridge Formula" allows motor vehicles to be loaded to the maximum weight only if each group of axles on the vehicle and their spacing also satisfy the requirements of the formula. States must use these limits for their designated or national network highways. While the majority of the states use the federal bridge formula for all roads in their state, some do have a separate state formula for other state or county roads. Tare weight is measured and a truck can be penalized for higher Tare weights.

National Fire Protection Agency "NFPA" 52: VEHICULAR GASEOUS FUEL SYSTEMS CODE "safeguards people and installations with requirements that mitigate the fire and explosion hazards associated with compressed natural gas (CNG) and liquefied natural gas (LNG) engine fuel systems and fueling facilities."

Section 6.3.4 of the code specifies that each fuel supply container rack shall be secured to the vehicle body, bed, or frame to prevent damage from road hazards, slippage, loosening, or rotation using a method capable of withstanding a static force in the six principal of eight times the weight of a fully pressurized container(s).

Moreover section 6.3.5 specifies that each fuel supply container in the rack shall be secured to its cradle in a manner that it is capable of withstanding a static force, applied in the six principal directions of eight times the weight of the fully pressurized container with a maximum displacement of 0.50 in. (13 mm).

A traditional rack and tank support system provides a steel rack/cage with compartments to hold tanks to meet such safety standards and bear loads.

DISCLOSURE

Briefly gaseous fuel stored in cylinders on a tractor and/or trailer add weight. Weight affects cost to operate and regulatory issues.

Cylindrical pressurized filament wrapped composite cylinders are a light weight alternative to metal tanks for storing gaseous fuels. Such cylinder can withstand hoop stress and axially stress applied externally of at least a quantity equal to the burst rating.

Traditionally vertical racks for mounting gaseous fuel cylinder are heavy steel or metal racks with trusses supporting the levels. Disclosed herein are aspects of exemplary implementations of a novel tank and rack method and system that obviate the shortfalls of traditional system with a cooperating structure for supporting cylindrical tanks in a vertical configuration with a decrease in at least one of rack footprint, size, mass, complexity and weight.

Traditionally vertical rack for mounting gaseous fuel cylinder, to meet safety regulations, are heavy steel or metal racks with trusses supporting the levels. Disclosed herein are aspects of exemplary implementations of a novel tank and rack method and system that obviate the shortfalls of traditional system with a cooperating structure for supporting cylindrical tanks in a vertical configuration with a decrease in at least one of rack footprint, size, mass, complexity and weight.

Aspects of the disclosure in some exemplary implementations include a fuel tank rack structure comprising at least two modules affixed together.

Aspects of the disclosure in some exemplary implementations include a fuel tank rack structure comprising at least two modules affixed together wherein cylindrical compressed gas fuel tanks connected to bases form modules and the modules are fastened together forming a rack.

Aspects of the disclosure in some exemplary implementations include fuel tank rack structures comprising at least two modules affixed together, wherein each module comprises a cylindrical fuel tank, two front bottom bases and two back bottom bases affixed to the bottom of the cylindrical fuel tank, two front top bases and two back top bases affixed to the top of the cylindrical fuel tank, wherein the at least two modules are fastened together in a vertical arrangement with the modules fastened together by affixing the front bottom bases of each successively higher module to the front top bases of the previous module and by affixing the back bottom bases of each successively higher module to the back top bases of the previous module, and wherein the top and bottom bases are sized to allow the modules to be fastened together in a vertical arrangement without allowing the tanks to touch.

Aspects of the disclosure in some exemplary implementations include a method of reduced weight vertical storage of fuel tanks for use in motor vehicles, the method comprising: affixing two front bottom bases, two back bottom bases bases, two front top bases, and two back top bases each to two or more cylindrical fuel tanks to form two or more modules; fastening two modules together with the one above the other forming a rack; and, wherein the weight of the rack compared to a rigid frame rack holding the same cylinders is reduced. In some instances the weight reduction is at least 20%. In some instances the weight reduction is at least 25%. In some instances the weight reduction is at least 30%. In some instances the weight reduction is at least 35%. In some instances the weight reduction is at least 40%. In some instances the weight reduction is at least 45%. In some instances the weight reduction is at least 50%. In some instances the weight reduction is at least 55%. In some instances the weight reduction is at least 60%. In some instances the weight reduction is at least 65%. In some implementations the load supported by each module is directed through the fuel tank from each top front base to the opposing bottom front base and from each top back base to the opposing bottom back base.

DRAWINGS

The above-mentioned features of the present disclosure will become more apparent with reference to the following description taken in conjunction with the accompanying drawings wherein like reference numerals denote like elements and in which.

As shall be appreciated by those having ordinary skill in the art, the figures are not to scale, and modifications to scale within a figure or across the figures are considered within the present disclosure.

FURTHER DESCRIPTION

Unlike traditional rack and tank support system with a steel rack/cage with compartments to hold tanks Wherein the rack is a unitary structure to which tanks are secured and the tanks form no part of the superstructure, disclosed herein are aspects of exemplary systems and methods wherein a cylindrical pressurized tank form an integral part of a superstructure for supporting one or more of such tanks in a motor vehicle.

FIGS. 1A-8 of the disclosure illustrates aspects of the disclosed exemplary implementations of cooperating tank and sub-rack elements forming a rack superstructure.

Figure 1A:
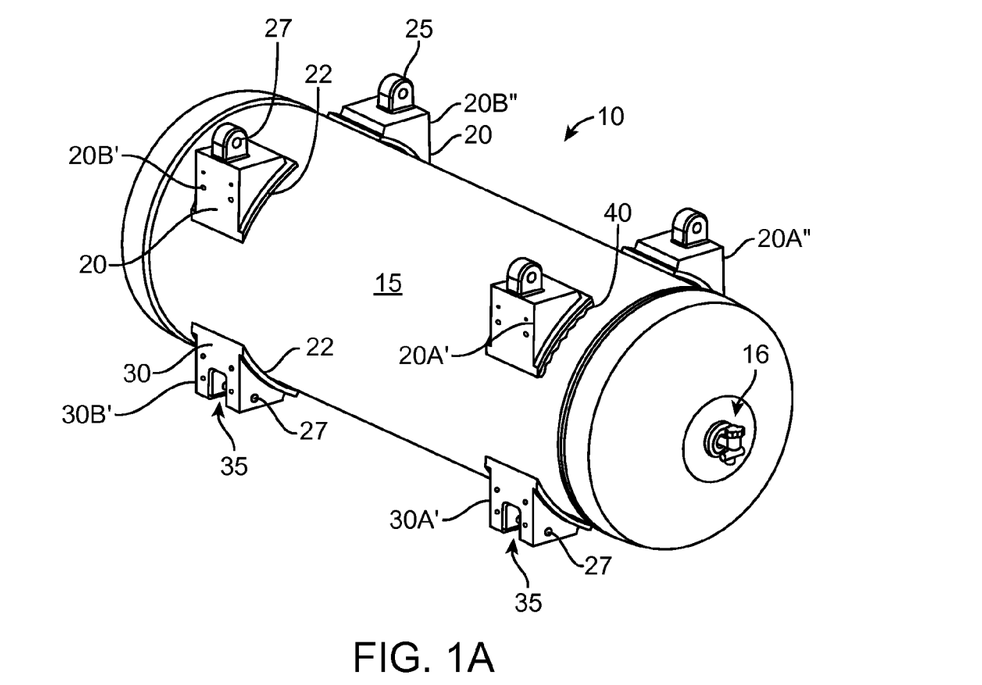
FIG. 1A shows aspects of a fuel tank rack module.
Figure 1B:
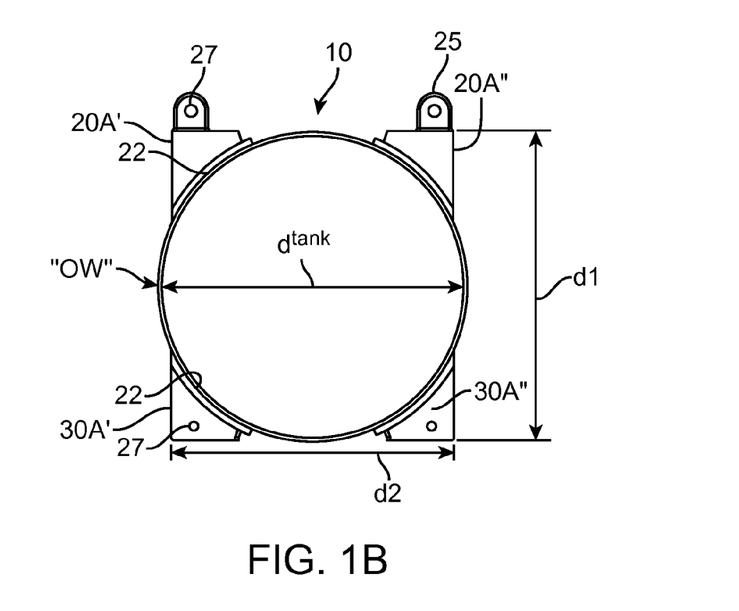
FIG. 1B shows a front view of aspects of the fuel tank rack module of FIG. 1A.

A rack module 10 forms a base element of a cooperating rack. The rack module 10 is a unit that both provide a pressurized fuel cylinder, mounting fixtures and is load bearing. A cylindrical composite fuel tank 15 with an input/output valve 16 is affixed to, or formed with, a series of bases.

In some exemplary implementations the bases are positioned symmetrically around the tank's circumference at about 90 degree offsets. The bases must be of adequate size to allow vertical stacking without allowing the tanks 15 to touch.

In some exemplary implementations the bases are positioned asymmetrically around the tank's circumference at about 90 degree offsets. The bases must be of adequate size to allow vertical stacking without allowing the tanks 15 to touch. However, with asymmetrical stacking the outer wall of the fuel tank "OW" may extend beyond the bases.

Although the modules illustrated herein show four bases touch points between modules, those of ordinary skill in the art will recognize that it is within the scope of this disclosure to add additional bases and such an addition does not go beyond the scope of this disclosure. For a longer fuel tank or larger circumference fuel tank additional bases may be necessary to provide additional support for a vertical rack structure. Additionally, a greater number of smaller bases with less load-bearing capacity may be substituted for a few larger bases with greater load-bearing capacity.

In some exemplary in implementations that bases are non-homogeneous. There are top bases 20 and bottom bases 30. The bottom of the tank can be affixed to four bottom bases: a front left bottom base 30A', a front bottom right base 30A", a back left bottom base 30B' and a back right bottom base 30B". The top of the tank can be affixed to four top bases: a front left top base 20A', a front top right base 20A", a back top left base 20B', and a back top right base 20B". Each base has an interface 22 wherein the bases region at the interface corresponds to the curvature of the fuel tank. Each top base 20A', 20A", 20B', 20B" has a head latch 25 extending. The head latch also has a pin guide 27 through which a top and bottom base may be connected. Each bottom base 30A', 30A", 30B', 30B" has a head catch 35 forming a well into the base. Each bottom base 30A', 30A", 30B', 30B" also has a pin guide 27 which passes through the catch 35, through which a top and bottom base may be connected.

It is envisioned that the bases are preferably steel. However, those of ordinary skill in the art will recognize that in some instances composite, laminate or other materials with adequate strength may be substituted without depart form the scope of the invention.

Bases must be affixed to tanks 15. Adhesive 40 is applied between the interface 22 and the fuel tank's outer wall "OW". The adhesive should have the properties of high tensile strength and flexibility. It should operate over at least about 5 years and more preferably at least about 10 years. Most preferably the adhesive should operate within its nominal load bearing requirements for at least 15 years. The temperature range the adhesive should operate in is between −40 degrees Celsius and +85 degrees Celsius.

Figure 2A:
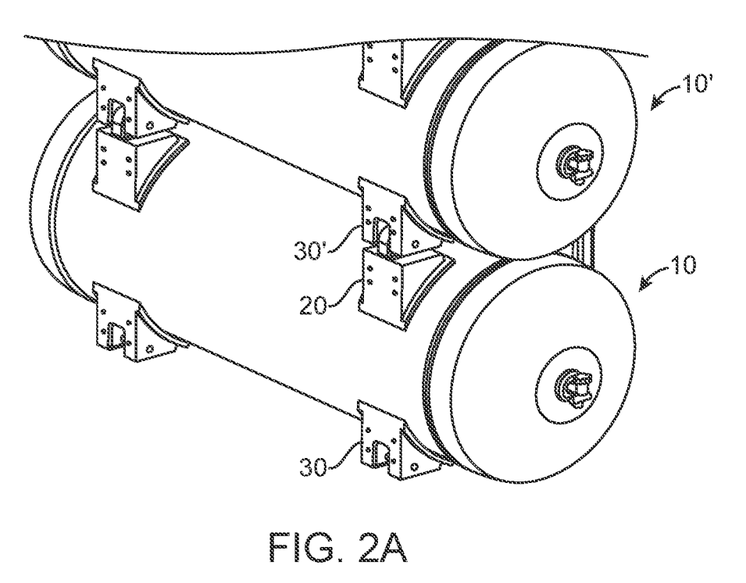
FIG. 2A shows a perspective view of aspects of the pin assembly of two rack modules.
Figure 2B:
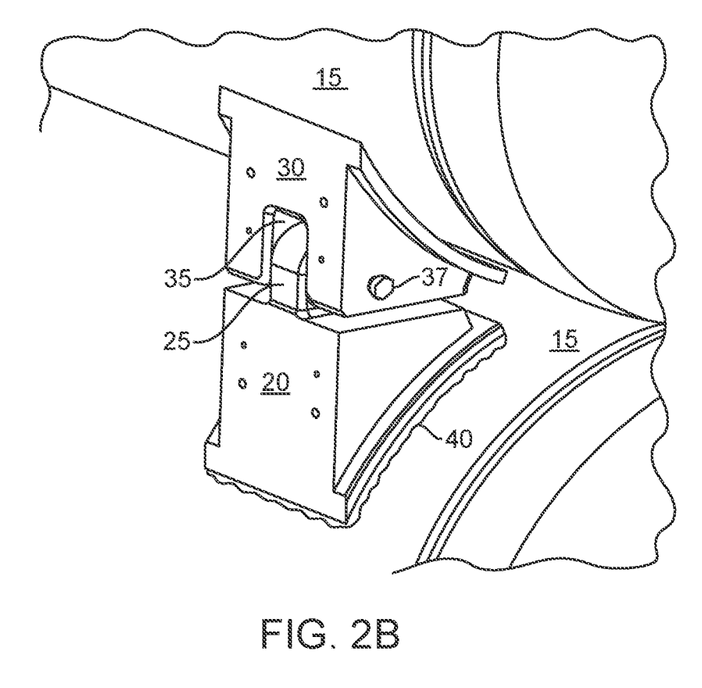
FIGS. 2B shows a close up of aspects of an assembly feature for rack modules.

When mounting a first module 10 to a second module 10' the head latches 25 are fitted and/or mated in to catches 35. A fastener 37 such as a pin, bolt or the like is inserted through the pin guides 27 and fixed in place.

Figure 3:
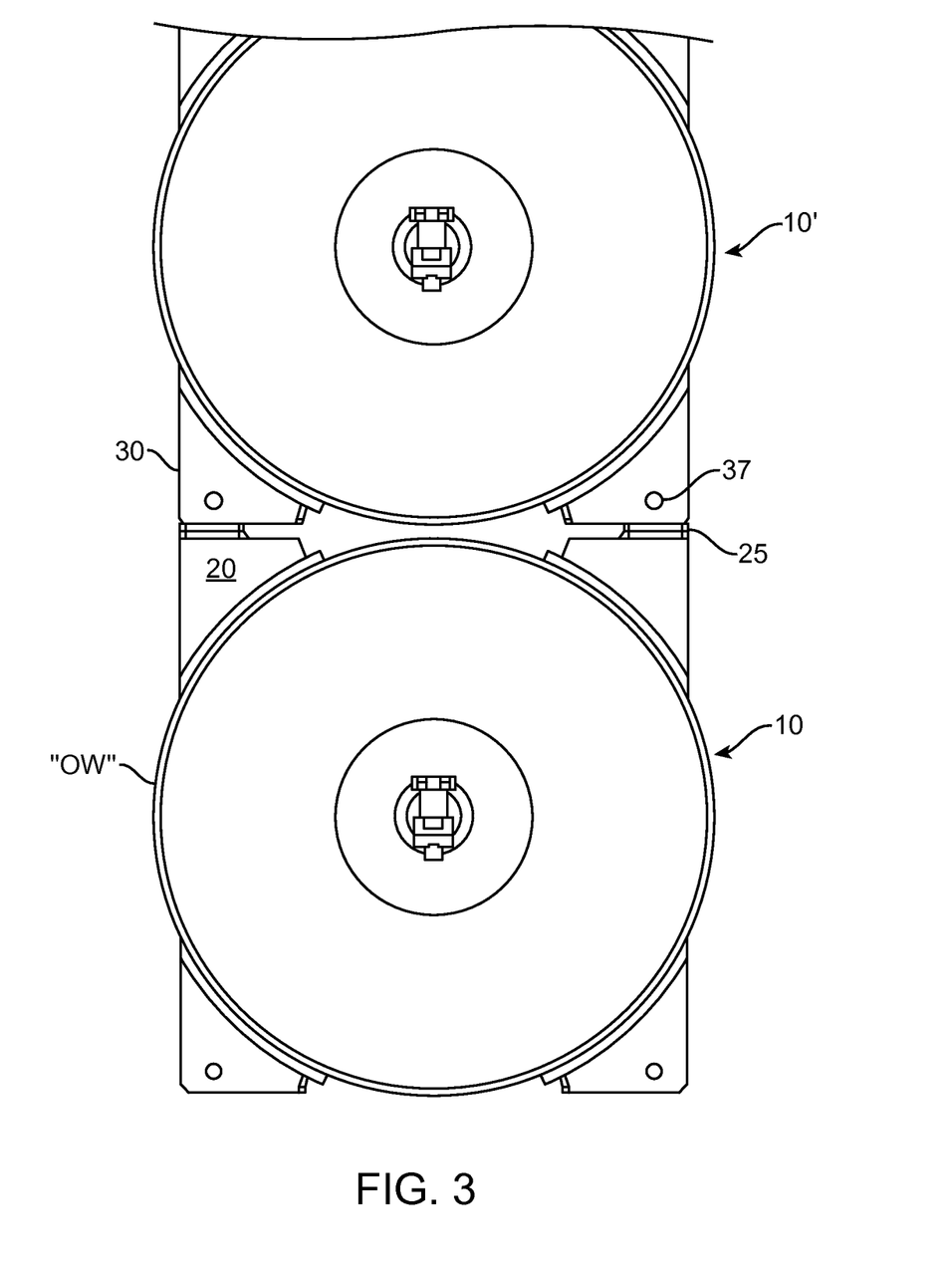
FIG. 3 is a front view of aspects of a first sub-rack module of FIGS. 2 and 4.
Figure 4:
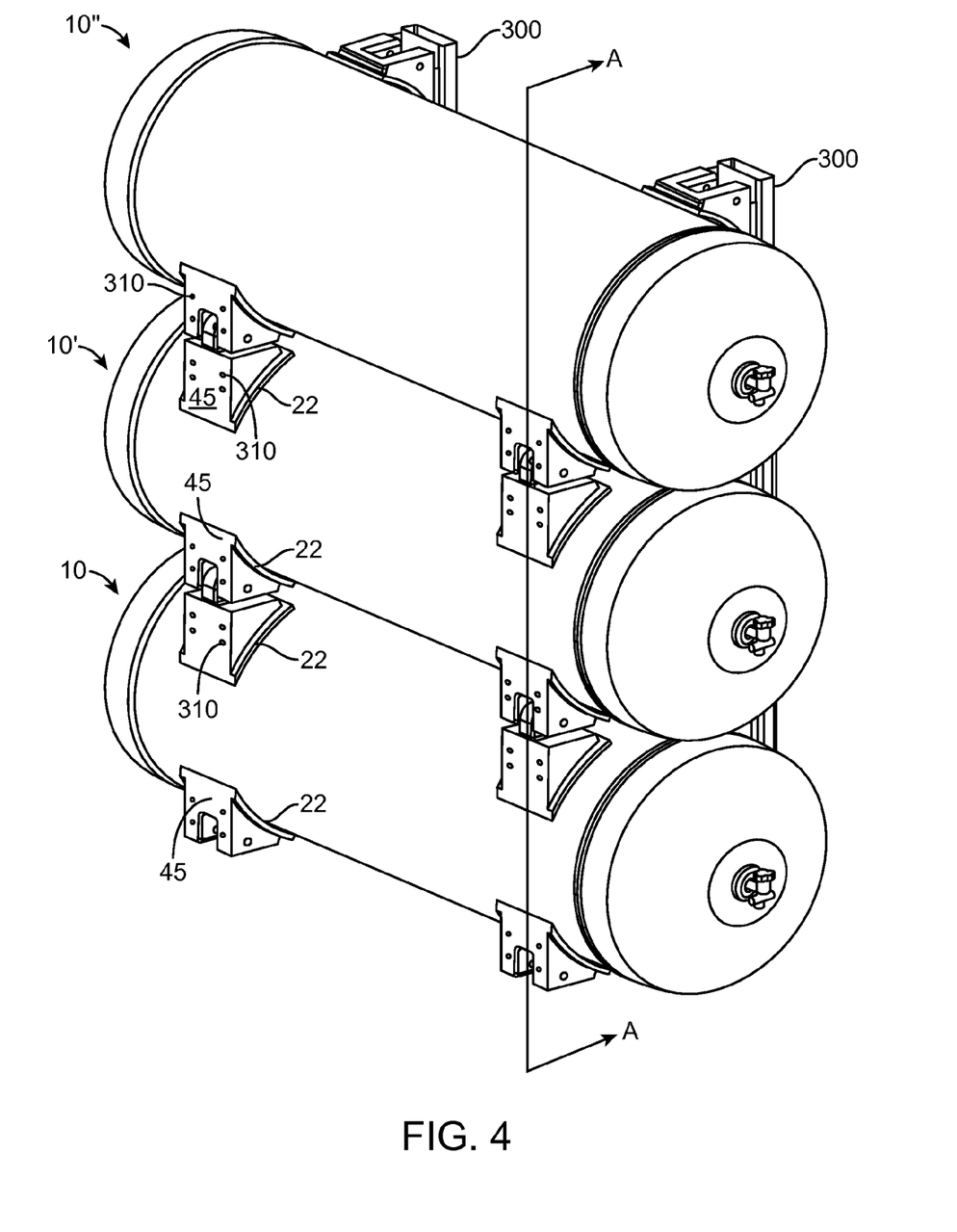
FIG. 4 shows a perspective view of aspects of an assembly of three rack modules.

The fuel tank 15 has a diameter "$d^{tank}$", and when mounted to bases (forming a module) in the asymmetrical configuration the outer edge to edge distance of a top base 20 to a bottom base 30 (from 20A' to 30A', 20A" to 30A", 20B' to 30B', and 20B" to 30B") is "$d^1$". The outer edge to edge distance between two front bottom bases or two back bottom bases (30A' to 30A", 30B' to 30B") is "$d^2$". In an asymmetrical configuration "$d^2$" is less than "$d^{tank}$" thereby minimizing footprint and space requirements to the tank. However in the distance between modules (and associated tanks) is defined by "$d^1$" which is greater than "$d^{tank}$" thereby keeping the fuel tanks from contacting each other.

Figure 7:
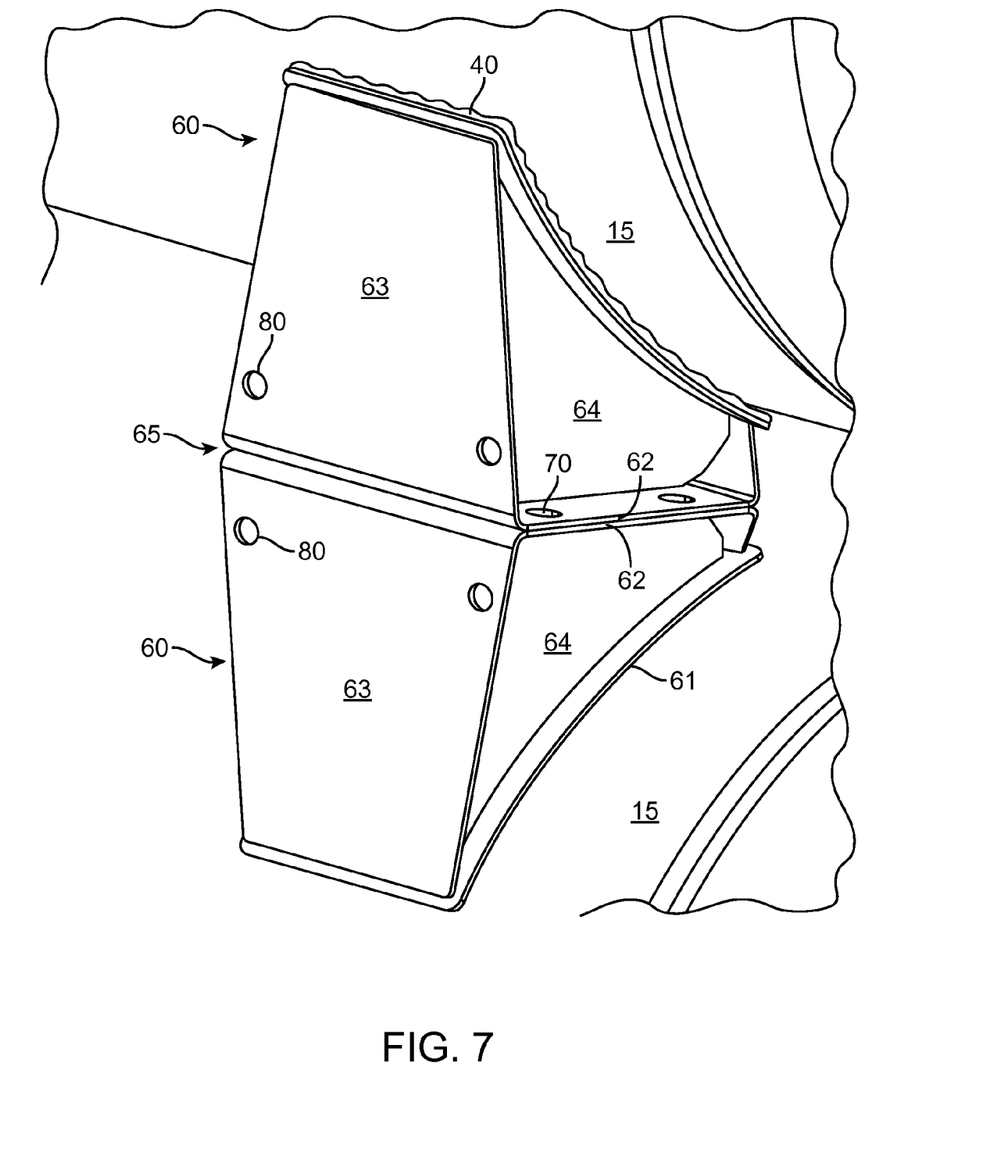
FIG. 7 shows aspects of an alternative bolt attachment method.

A vertical rack is formed when two or more modules are attached. Unlike traditional racks which are unitary cage structures to which fuel tanks are secured and the tanks form no part of the superstructure, disclosed herein are modules which include the fuel tank and which are the superstructure of the rack. Shown in FIG. 7 is a two tier vertical rack 280 formed of two modules 10 and 10'. The vertical mounting members 300 are fixtures to add the rack (which also includes the gaseous fuel) to a truck. Modules, at the bases, provide a substantially vertical interface 45 with mountings 310 to accept corresponding fasteners 315.

Figure 5:
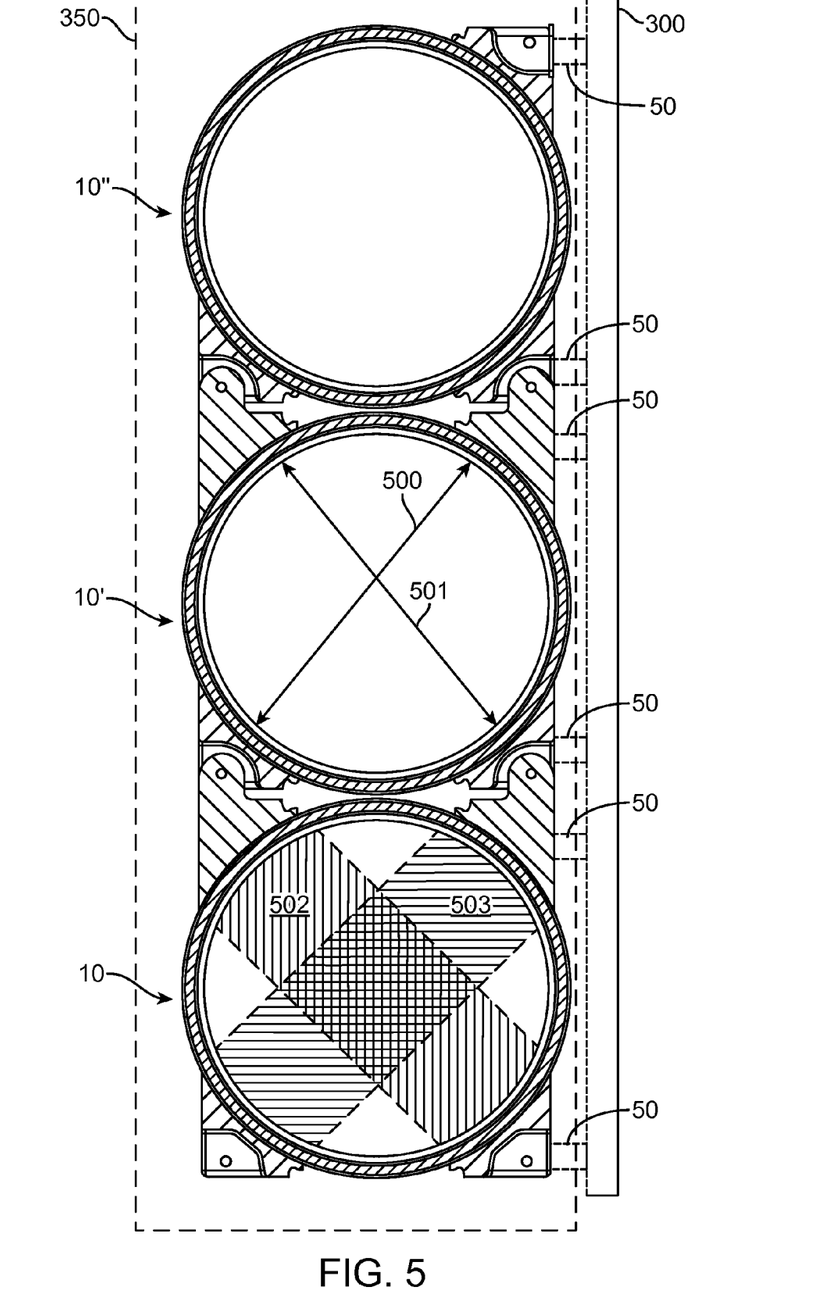
FIG. 5 is a cut away view of the assembly of three rack modules of FIG. 4 along line "A-A"

Shown in FIG. 5 is a three tiered rack 350 formed of modules (10, 10', and 10"). The strength of the rack is provided by cooperating module 10. Rather than affixed fuel tanks to a ridged frame structure which meets the NFPA 52 and/or other standards disclosed herein is a method and system of modules that cooperate to form the superstructure. The fuel tank is a sub-member of the module thereby reducing weight which in turn can reduce Tare weight of a truck using this system. Those of ordinary skill in the art will recognize that this arrangement is antithetical to a rigid superstructure rack to which fuel tanks are affixed.

Force lines 500 and 501 illustrate how the cylindrical fuel tank 15 when affixed to top bases 20 and bottom bases 30 (a first module 10) supports the load of the next module(s) 10' and 10". The load supported by each module is directed through the module from each top front base to the opposing bottom front base, from 20A' to 30A" and from 20A" to 30A', and from each top back base to the opposing bottom back base, from 20B' to 30B" and from 20B" to 30B'. The cylindrical tanks both carry fuel and are structural supports forming the rack 350. Each fuel tank 15 is cylindrical and preferably has a burst pressure of about 2.2 to 3 times its nominal psi rating. That burst pressure equates to a crush strength. If the nominal psi rating is 3000 psi the force needed to crush the tank will be between about 6600 psi and about 9000 psi. The strength of the tank is adequate to withstand a static force, applied in the six principal directions of eight times the weight of the fully pressurized container with a maximum displacement of 0.50 in.

When affixing the rack 350 to a truck a vertical member 300 which is firmly mounted to the truck can be used. A series of isolators 50 formed of a rubber-like boundary layer to reduce friction of a mounted module against the vertical members 300 are interspaced between the bases (20/30) and the vertical members 300.

Force zones 502 and 503 are another representation of the force at play whereby the hoop strength and crush parameters of the fuel tank over an area (zone) corresponding substantially to the footprint of each base is sufficient to support the above module(s) to counter a static force, applied in the six principal directions of eight times the weight of the fully pressurized container with a maximum displacement of 0.50 in.

Figure 6:
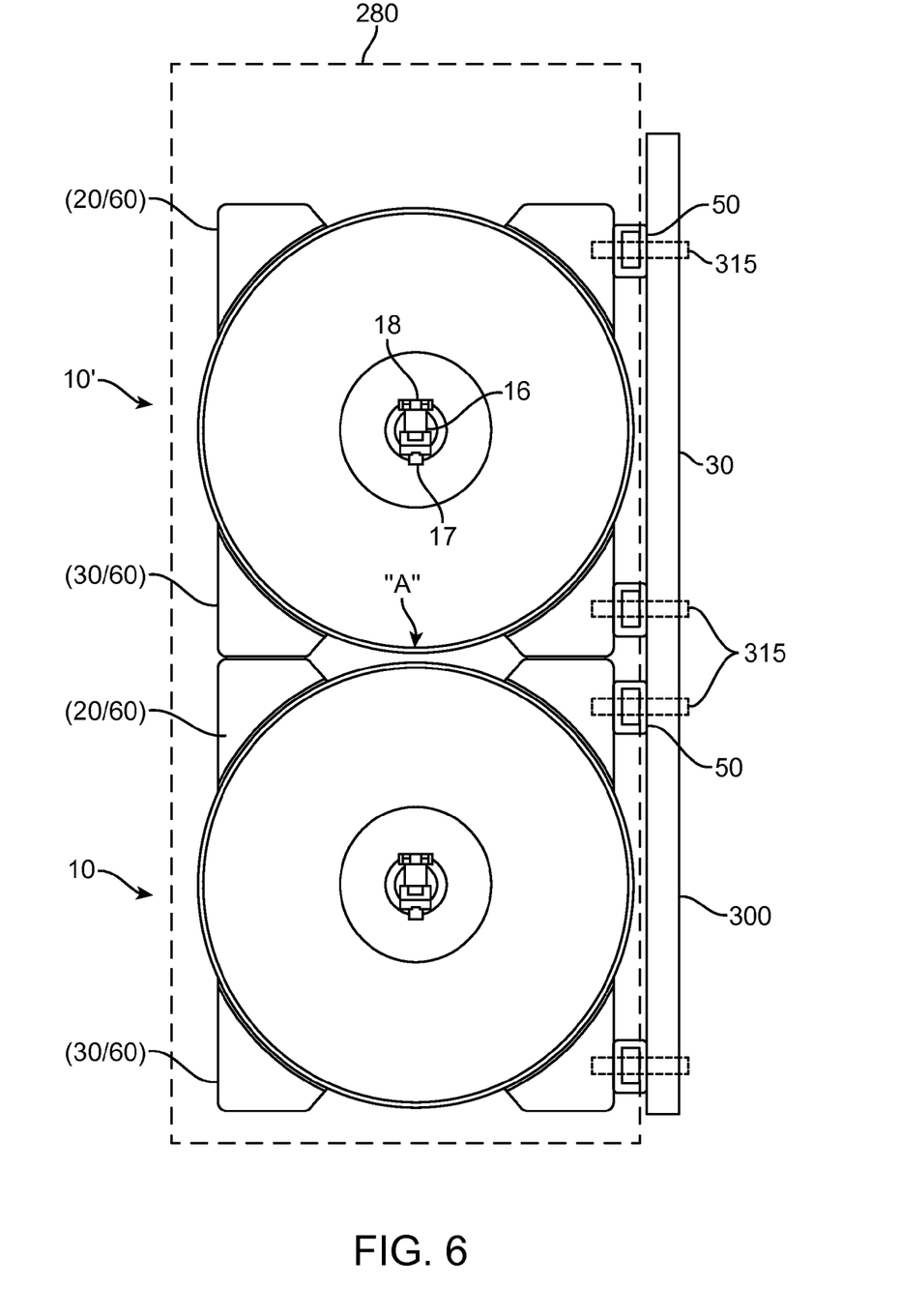
FIG. 6 shows aspects of attachment of two rack modules to a vertical anchor.

FIG. 6 illustrates the placement of the tank valve 16 in a two tier rack 280 affixed to a vertical support member 300. The tank valve has a bottom 17 and a top 18. To align the bottom 17 of the valve in a predetermine position it is necessary to affix the bases (20/30) wherein the orientation of the valve (clocking) is such that the bottom 17 will align with a set point "A" along the circumference of the module. To affix the modules to the vertical support fasteners 315 are inserted through guides in the vertical member 300 through the rubber-like isolator 50 and into the vertical interface 45 mountings 310. Those of ordinary skill in the art will recognize that this arrangement is antithetical to a rigid superstructure rack to which fuel tanks are affixed.

Figure 8:
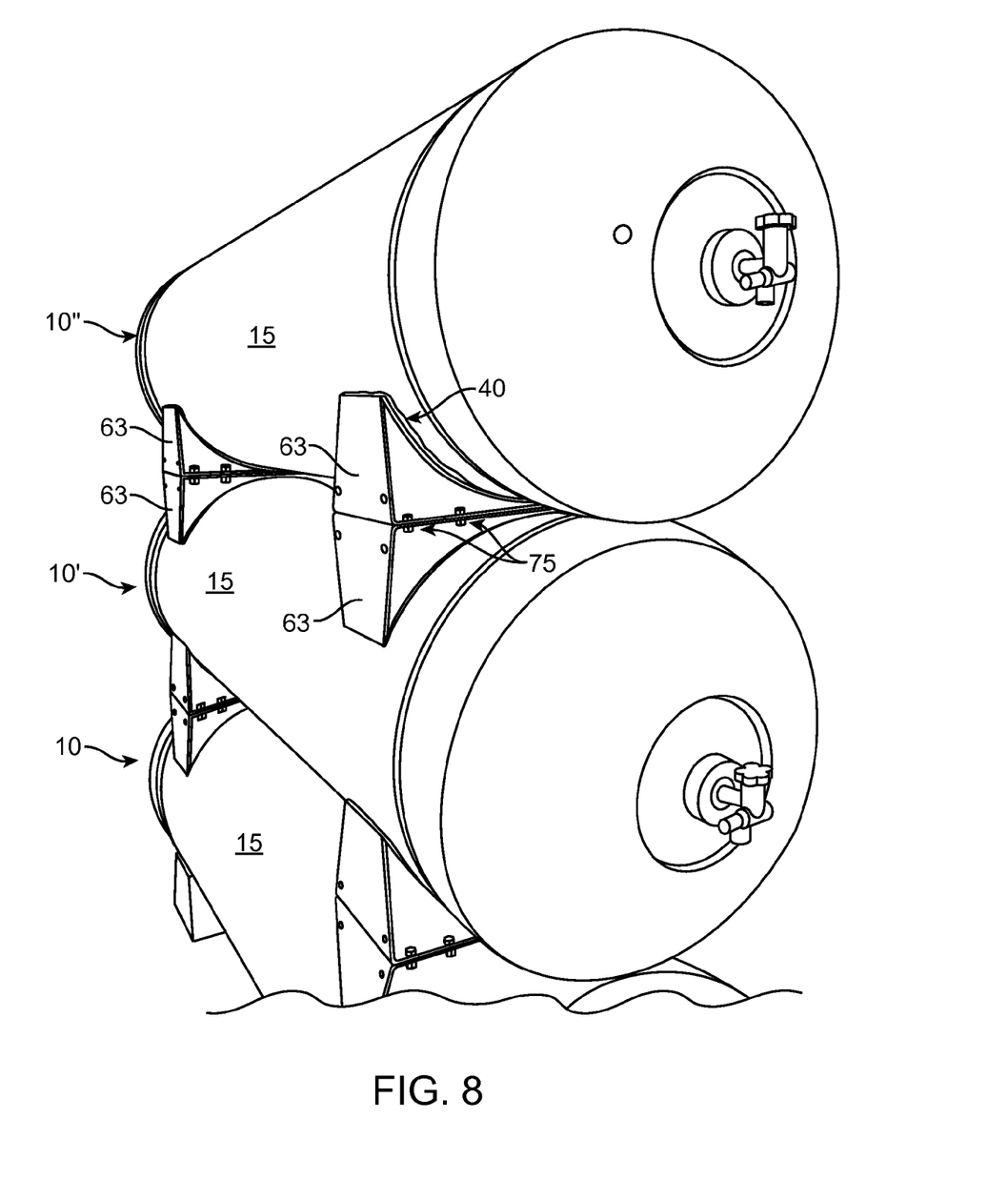
FIG. 8 shows a perspective view of aspects of 3 rack modules prior to mounting to a vertical anchor.

FIGS. 7 and 8 illustrate an alternate base configuration wherein a unitary base 60 is used in lieu of the top and bottom bases. The unitary base can act as both a top and a bottom base. The base is adhered to the fuel tank 15 via an adhesive 40. The unitary base has three interfaces. An arc shaped interface 61 which corresponds to the curvature of a fuel tank and is configured to accept adhesive. Such configuration may include surface treatment, acid wash, ion etching, milling, chemical treatment, increased roughness, increased surface porosity and the like. The second interface is a base interface 62 whereby two bases are connected when adding modules to a vertical rack. The third interface is a truck mounting interface 63 whereby modules may be mounted to vertical elements for truck mounting. A support body 64 is provided integral to the bases and attached to the interfaces. A series of module mounting guides "MMG" 70 are provided along the base interface to allow for fastening of bases together with fasteners 75. A varies of truck mounting guides "TMG" 80 are provide along the truck mounting interfaces to allow the rack to be mounted to vertical members 300.

Those of ordinary skill in the art will recognize that this arrangement is antithetical to a rigid superstructure rack to which fuel tanks are affixed.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A fuel tank rack structure comprising at least two modules (10/10') affixed together,
   wherein each module comprises:
      a cylindrical fuel tank (15);
      two front bottom bases (30A'/30A") and two back bottom bases (30B'/30B") affixed to the bottom of the cylindrical fuel tank (15);
      two front top bases (20A'/20A") and two back top bases (20B'/20B") affixed to the top of the cylindrical fuel tank (15);
   wherein the at least two modules are fastened together in a vertical arrangement with the modules fastened together by affixing the front bottom bases of each successively higher module (10') to the front top bases of the previous module (10) and affixing the back bottom bases of each successively higher module (10') to the back top bases of the previous module (10);
   wherein the top and bottom bases are sized to allow the modules (10/10') to be fastened together in a vertical arrangement without allowing the tanks (15) to touch; and,
   wherein the front top bases and the back top bases comprise an interface (22) corresponding to the curvature of the fuel tank, a head latch (25) extending upwards, and a pin guide (27) disposed in the head latch;
      the front bottom bases and the back bottom bases comprise an interface (22) corresponding to the curvature of the fuel tank, a head catch (35) forming a well in the bottom base, and a pin guide (27) disposed in the head catch; and,
      the pin guides of each pair of top and bottom bases that are affixed together are aligned and a fastener (37) is inserted through the aligned pin guides and fixed in place.

2. The fuel tank rack structure of claim 1 wherein the fuel tanks (15/15') in each module form a portion of the superstructure of the rack (280).

3. The fuel tank rack structure of claim 1 wherein, for each fuel tank (15), an outer edge to edge distance between each of the two front bottom bases (30A'/30A"), two front top bases (20A'/20A"), two back bottom bases (30B'/30B"), and two back top bases (20B'/20B") is less than a diameter of the fuel tank (15).

4. The fuel tank rack structure of claim 1 wherein, for each fuel tank (15), an outer edge to edge distance between the two front top bases (20A'/20A") and the two front bottom bases (30A'/30A") and an outer edge to edge distance between the two back bottom bases (30B'/30B") and two back top bases (20B'/20B") is greater than a diameter of the fuel tank (15).

* * * * *